United States Patent [19]

Dorrance et al.

[11] 4,027,003

[45] May 31, 1977

[54] THERMOCHEMICAL PRODUCTION OF HYDROGEN AND OXYGEN FROM WATER

[75] Inventors: William H. Dorrance; Rane L. Curl, both of Ann Arbor, Mich.

[73] Assignee: Organization Control Services, Inc., Ann Arbor, Mich.

[22] Filed: Oct. 30, 1975

[21] Appl. No.: 627,246

[52] U.S. Cl. .......................... 423/579; 423/648 R; 423/657
[51] Int. Cl.² ..................... C01B 13/00; C01B 1/00
[58] Field of Search ................... 423/579, 648, 657

[56] References Cited

UNITED STATES PATENTS

| | | | |
|---|---|---|---|
| 3,821,358 | 6/1974 | Interrante et al. | 423/657 |
| 3,839,550 | 10/1974 | Wenfort | 423/657 |

*Primary Examiner*—O. R. Vertiz
*Assistant Examiner*—Gregory A. Heller
*Attorney, Agent, or Firm*—Olsen and Stephenson

[57] ABSTRACT

A process is disclosed which produces hydrogen and oxygen from water by means of a multi-step, closed, thermochemical cycle. Hydrogen and oxygen are produced at separate stations. Hydrogen and a halogen are produced by a sub-cycle involving transition metal or lanthanide compounds (depending on the halogen) and a hydrogen halide. Oxygen and the hydrogen halide are produced in a sub-cycle involving magnesium or transition metal compounds (depending on the halogen), the halogen and water. When the halogen is chlorine the transition metals in the oxygen producing sub-cycle can be nickel, cobalt, or yttrium and the lanthanide metals in the hydrogen producing sub-cycle can be samarium, europium, or ytterbium. When the halogen is bromine, the metals in the oxygen producing sub-cycle can be manganese or cobalt and the metals in the hydrogen producing sub-cycle can be vanadium or chromium.

26 Claims, 2 Drawing Figures

THERMOCHEMICAL PRODUCTION OF HYDROGEN AND OXYGEN FROM WATER

BACKGROUND OF THE INVENTION

Hydrogen is a vital raw material or reducing agent for the fertilizer, substitute natural gas production, oil refining, chemical, and food and materials processing industries. Currently hydrogen is produced by reforming of natural gas, petroleum or coal, by partial oxidation of hydrocarbons or by electrolysis of water. The first two methods consume natural resources and the last method is capital intensive, costly and inefficient. Direct thermal decomposition of water requires impractically high temperatures for significant yields of hydrogen and oxygen and engenders the problem of preventing the oxygen and hydrogen from recombining when the product gases are cooled down for storage and/or distribution.

It has long been known that it is theoretically possible to produce oxygen and hydrogen from water by introducing heat and water into a closed thermochemical cycle involving intermediate chemical compounds. Calculations for such cycles suggest that they can be more efficient in the consumption of process heat than is water electrolysis.

The Euratom Mark I process is one such closed thermochemical cycle which uses intermediate calcium, bromine and mercury compounds and process heat at temperatures exceeding 700° C. As is indicated in U.S. Pat. No. 3,821,358, mercury is highly volatile and its loss to the surrounding atmosphere would pose a significant ecological and health hazard.

Other cycles involve dilute water solutions and serious problems of energy consumption to effect the product separations required. Very high efficiencies during such product separations are required if overall process efficiencies are to be competitive with electrolysis. In such cycles much heat is consumed heating and evaporating solvent water.

It is an object of this invention to provide a closed cycle thermochemical process which presents fewer product separation problems, involves no heating or evaporative separations of dilute solutions of salts, has cycle thermal efficiencies higher than that of electrolysis, and is adaptable to process heat which can be provided by any source of high temperature heat such as nuclear fusion or fission reactors or solar energy collection and concentration systems.

SUMMARY OF THE INVENTION

The closed cycle thermochemical process embodying the present invention requires the use of a halogen which can be either chlorine or bromine. When chlorine is used the oxygen and hydrogen chloride producing sub-cycle entails two chemical reactions. When bromine is the halogen used the oxygen and hydrogen bromide producing sub-cycle entails three chemical reactions.

When the halogen is chlorine, the process includes the steps of (a) decomposing a metal trichloride, selected from the group consisting of samarium, europium and ytterbium trichlorides, at a temperature sufficient to produce a metal dichloride and chlorine gas; (b) removing the chlorine formed during said decomposition; (c) bringing the chlorine into contact with a metal oxide at a temperature sufficient to produce a metal chloride and oxygen, the metal oxide being selected from a group consisting of magnesium, nickel, cobalt and yttrium oxides; (d) removing and collecting the oxygen produced during the chlorine-metal oxide reaction; (e) hydrolyzing the metal chloride formed during the reaction of step (c) at a temperature sufficient to produce the metal oxide used during step (c) and hydrogen chloride gas; (f) reacting the hydrogen chloride produced by the reaction step (e) with the metal dichloride produced by step (a) at a temperature sufficient to produce a metal trichloride and hydrogen gas; (g) removing and collecting said hydrogen gas; and (h) decomposing said trichloride as recited in step (a), and repeating the cycle.

When the halogen is bromine, the process includes the steps of (a) decomposing a metal tribromide, selected from the group consisting of vanadium and chromium tribromides, at a temperature sufficient to produce a metal dibromide and bromine gas; (b) removing the bromine formed during said decomposition; (c) bringing the bromine in contact with a metal oxide at a temperature sufficient to form a higher valence metal oxide and a metal bromide, the metal oxide being selected from a group consisting of manganese and cobalt oxides; (d) removing the metal oxide and metal bromide products of the reaction of step (c) and separating them; (e) removing said metal oxide; (f) decomposing the metal oxide at a temperature sufficient to produce a lower valence metal oxide and oxygen gas; (g) removing and storing said oxygen; (h) removing the metal bromide separated in step (d); (i) hydrolyzing the removed metal bromide at a temperature sufficient to produce a metal oxide and hydrogen bromide; (j) collecting the metal oxides produced by steps (f) and (i) and reacting them with bromine as recited in step (c); (k) reacting the hydrogen bromide produced by the reaction of step (i) with the metal dibromide produced in step (a) at a temperature sufficient to produce a metal tribromide and hydrogen gas; (l) removing and collecting said hydrogen gas; and (m) decomposing said tribromide as recited in step (a) and repeating the cycle.

Other objects of this invention will appear in the following description and appended claims, reference being had to the accompanying drawings forming a part of this specification.

DESCRIPTION OF THE PREFERRED EMBODIMENTS

Chlorine Cycles

Figure 1:
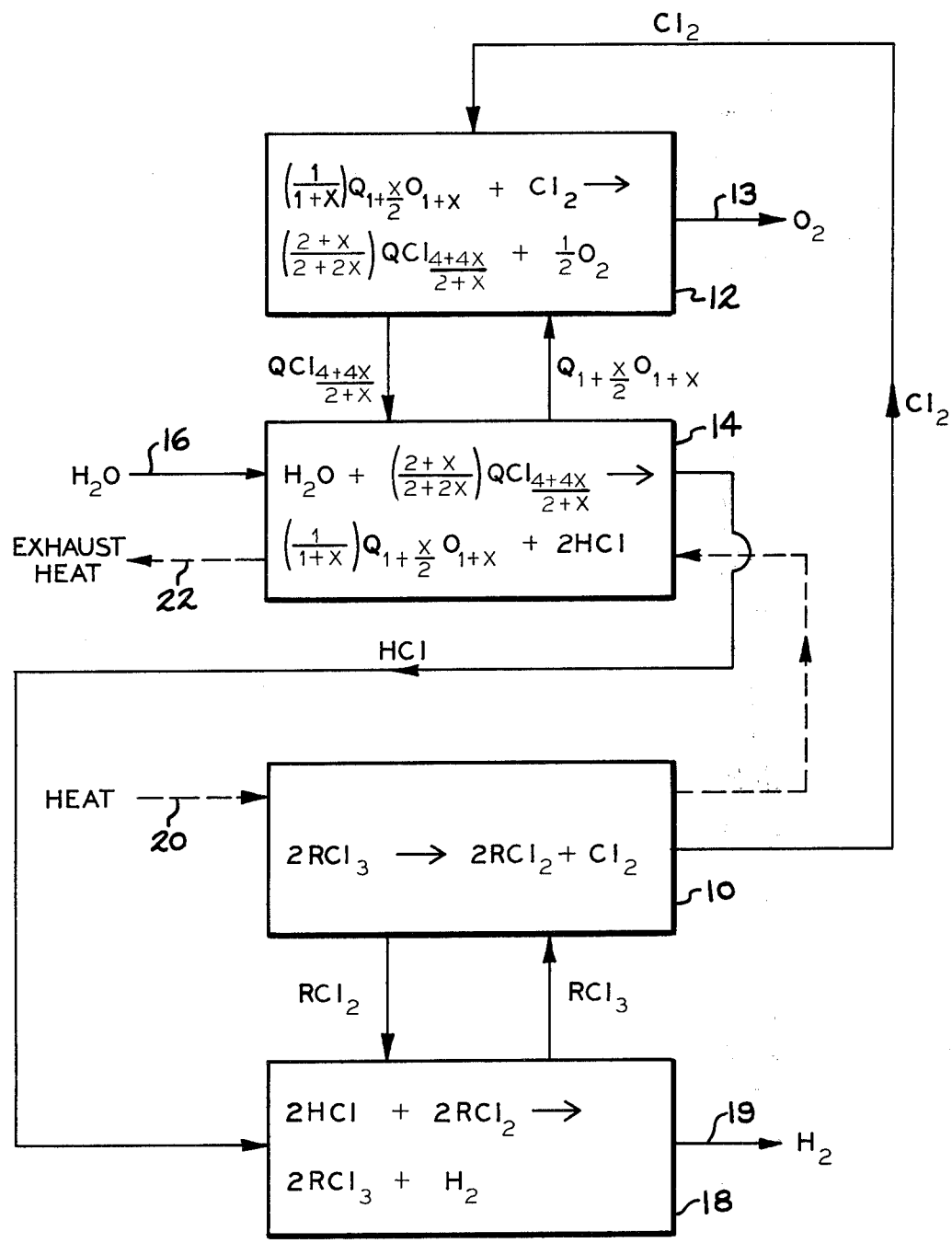
FIG. 1 is a flow diagram of the process embodying the present invention when chlorine is the halogen employed.

Referring to FIG. 1, beginning with reactor 10, chlorine gas is produced by thermally decomposing a trichloride compound according to the endothermic reaction (s means solid phase, g means gas and l means liquid):

where R can be any one of the lanthanide metals samarium, europium or ytterbium. The reaction temperatures depend on the metal R used and are for equilibrium constants, K, equal to 1 and 100; approximately:

|  | K = 1 | K = 100 |
|---|---|---|
| samarium | 1700° C | 2850° C |
| europium | 850° C | 1300° C |
| ytterbium | 1050° C | 1700° C |

Lower temperatures at equal yields are possible if the reaction proceeds in a partial vacuum. Chlorine gas from reactor 10 is conducted to reactor 12 where it is reacted with a metal oxide to produce a metal chloride and oxygen according to the exothermic reaction:

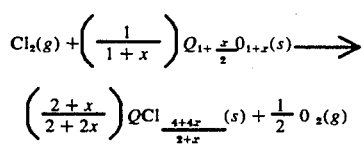

where the metal Q can be any one of the metals magnesium, nickel, cobalt or yttrium and the approximate reaction temperature and formula subscript $x$ depends upon which metal is employed as follows for equilibrium constants, K, equal to 1 and 100:

|  |  | K = 1 | K = 100 |
|---|---|---|---|
| magnesium | x = 0 | 400° C | 150° C |
| nickel | x = 0 | 800° C | 400° C |
| cobalt | x = 0 | 900° C | 450° C |
| yttrium | x = 2 | 250° C | 50° C |

The oxygen 13 produced in reactor 12 is drawn off and stored for use. The metal chloride produced in reactor 12 is transported to reactor 14 where water 16 is introduced to produe the metal oxide for the reaction of reactor 12 and hydrogen chloride gas by the endothermic hydrolysis reaction:

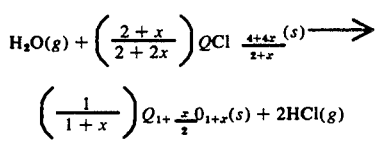

where the approximate reaction temperatures and formula subscript $x$ depend on the metal Q used as follows for equilibrium constants, K, equal to 1 and 100:

|  |  | K = 1 | K = 100 |
|---|---|---|---|
| magnesium | x = 0 | 500° C | 900° C |
| nickel | x = 0 | 700° C | 1150° C |
| cobalt | x = 0 | 750° C | 1200° C |
| yttrium | x = 2 | 450° C | 750° C |

The metal oxide produced in reactor 14 is transported to reactor 12 previously described. The hydrogen chloride gas is conducted to reactor 18 where it is reacted with the metal dichloride produced in reactor 10 to produce a metal trichloride and hydrogen gas 19 by means of the exothermic reaction:

$2HCl(g) + 2RCl_2(s) \rightarrow 2RCl_3(s) + H_2(g)$ where the metal R can be samarium, europium or ytterbium. The reaction temperatures depend upon the metal R and are for equilibrium constants, K, equal to 1 and 100; approximately:

|  | K = 1 | K = 100 |
|---|---|---|
| samarium | 900° C | 700° C |
| europium | 50° C less than | 25° C |
| ytterbium | 400° C | 300° C |

The reaction temperatures can be raised in order to increase reaction rates, at the same yields, when the hydrogen chloride reactant gas pressure is increased.

The trichloride product compound produced in reactor 18 is transported to reactor 10 previously described. The hydrogen gas 19 is drawn off for storage or use.

Process heat 20 is introduced to reactor 10 and thence to reactor 14 to supply the endothermic reaction heat required by these reactions. Otherwise waste heat contained within the exhaust heat 22 can be used to evaporate the feedstock water 16 and for power production.

Thermal efficiencies for the twelve separate cycle compositions which are possible range from 0.622 to 0.817. Thermal efficiency is defined as the ratio of the heat of dissociation of liquid water (68.32 kcal per mole) to the externally supplied process heat required for the cycle. Exothermic reaction heat is assumed to be used internally when reaction temperatures permit it. The maximum efficiencies calculated in this manner for the various combinations of metal Q and metal R are given in the following table:

| Metal Q | Metal R | Maximum cycle thermal efficiency |
|---|---|---|
| Mg | Sm | .700 |
| Mg | Eu | .815 |
| Mg | Yb | .684 |
| Ni | Sm | .700 |
| Ni | Eu | .817 |
| Ni | Yb | .622 |
| Co | Sm | .700 |
| Co | Eu | .734 |
| Co | Yb | .622 |
| Y | Sm | .700 |
| Y | Eu | .817 |
| Y | Yb | .698 |

Bromine Cycles

Figure 2:
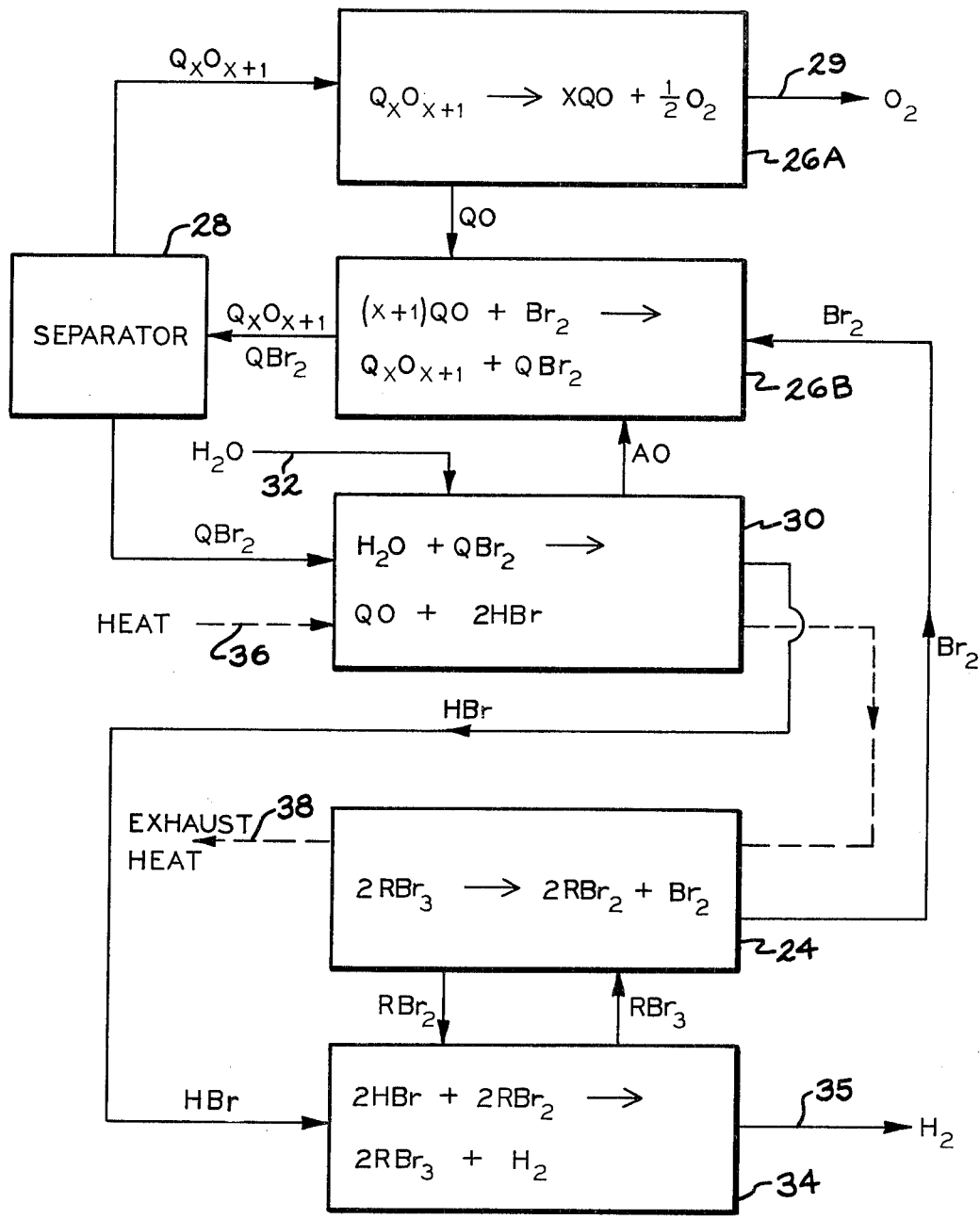
FIG. 2 is a flow diagram of the process embodying the present invention when bromine is the halogen employed.

Referring to FIG. 2, beginning with reactor 24, bromine gas is produced by thermally decomposing a tribromide compound according to the endothermic reaction:

$2RBr_3(s) \rightarrow 2RBr_2(s) + Br_2(g)$ where the metal R can be vanadium or chromium and the approximate temperatures of the reaction depend upon the metal R as follows for equilibrium constants, K, equal to 1 and 100:

|  | K = 1 | K = 100 |
|---|---|---|
| vanadium | 650° C | 900° C |
| chromium | 750° C | 1000° C |

Lower temperatures with equal yield are possible if the reaction takes place in a partial vacuum. Bromine gas from reactor 24 is conducted to reactor 26B where it is reacted with a metal oxide to produce a higher valence metal oxide and a metal bromide according to the exothermic reaction:

$$(x+1)QO\,(s) + Br_2(g) \rightarrow Q_xO_{x+1}(s) + QBr_2(l)$$

where the metal Q can be manganese or cobalt and where the reaction temperature and subscript $x$ depend upon the metal Q employed and are for equilibrium constants, K, equal to about 1:

| manganese | $x = 1$; | about 700° C |
|---|---|---|
| cobalt | $x = 3$; | about 700° C |

The metal bromide and higher valence metal oxide products formed in reactor 26B are transported to the separator 28. The metal bromide is separated from the metal oxide by a suitable means such as by flotation upon a liquid having a specific gravity between that of the metal bromide and that of the metal oxide. When the metal Q is manganese a suitable liquid is molten copper bromide, CuBr. When the metal Q is cobalt a suitable liquid is molten silver chloride, AgCl.

The metal oxide is transported from separator 28 to reactor 26A where it is thermally decomposed by the endothermic reaction:

$$Q_xO_{x+1}(s) \rightarrow xQO\,(s) = \tfrac{1}{2}O_2(g)$$

where the metal Q is manganese or cobalt and the subscript $x$ and the approximate reaction temperatures depends upon the metal Q and are for equilibrium constants, K, equal to 1 and 100:

|  |  | K = 1 | K = .100 |
|---|---|---|---|
| manganese | $x = 1$; | 950° C | 1650° C |
| cobalt | $x = 3$; | 900° C | 1250° C |

The oxygen 29 produced in reactor 26A is drawn off for storage or use. The lower valence metal oxide produced in reactor 26A is transported to reactor 26B where it is reacted with bromine as previously described.

Hydrogen bromide is produed by hydrolysis of the metal bromide produced in reactor 26B, separated by separator 28 and transported to reactor 30 for that purpose. The feedstock water in the form of steam 32 is fed to reactor 30 where it reacts with the metal bromide according to the endothermic hydrolysis reaction:

$$H_2O(g) + QBr_2(s) \rightarrow QO(s) + 2HBr(g)$$

where the metal Q is manganese or cobalt as before. Temperatures for this reaction depend upon the metal Q used and are for equilibrium constants, $K$, equal to 1 and 100: approximately:

|  | K = 1 | K = 100 |
|---|---|---|
| manganese | 1100° C | 2000° C |
| cobalt | 1050° C | 2050° C |

The metal oxide produced in reactor 30 is transported to reactor 26B where it is reacted with bromine gas as described previously. The hydrogen bromide gas is conducted to reactor 34 where it is reacted with the metal dibromide, which is produced in reactor 24 and transported to reactor 34 for the exothermic reaction:

$$2HBr(g) + 2RBr_2(s) \rightarrow 2RBr_3(s) + H_2(g)$$

The metal tribromide is transported to reactor 24 for thermal decomposition as previously described. The hydrogen 35 is drawn off for storage or use. The reaction temperatures depend upon the metal R which can be either vanadium or chromium and are for equilibrium constants greater than 1:

| vanadium | 25° C to 50° C |
|---|---|
| chromium | 50° C to 100° C |

These reaction temperatures can be increased to improve reaction rates at the same hydrogen yield if the hydrogen bromide reactant gas pressure is increased.

Process heat 36 is introduced to reactor 30 and thence to reactor 24 to provide the endothermic heat for the chemical reactions which take place within. Heat contained in the exhaust heat 38 can be used to evaporate the feedstock water 32 and to generate power.

The maximum thermal efficiencies of the four possible bromine cycles formed by use of different combinations of the metals Q and R range from 0.603 to 0.818. Calculated thermal efficiencies for the four bromine cycles are given in the following table:

| Metal Q | Metal R | Maximum cycle thermal efficiency |
|---|---|---|
| Mn | V | .818 |
| Mn | Cr | .638 |
| Co | V | .620 |
| Co | Cr | .603 |

The above described chlorine and bromine cyles possess several inherent advantages in common including:

1. The hydrogen and oxygen product gases are produced in separate reactors having only one other product which is in a condensed phase. This facilitates the product gas separations.

2. The reactions which produce the hydrogen are exothermic. Thus these reactions are facilitated by decreasing reaction temperature and can be reacted at the lowest temperature having feasible reaction rates.

3. The reactions which produce hydrogen are facilitated by increasing the pressure of the hydrogen halide reactant gas. Thus high reaction rates and high conversions at temperatures higher than some of the relatively low equilibrium temperatures cited are possible if the reactant gas is compressed.

In addition to the above advantages held in common the chlorine cycles possess the advantages that the reactions which produces oxygen are exothermic and facilitated by reactant chlorine gas compression. Thus high reaction rates and high conversions at temperatures lower than those indicated for these reactions are possible if reactant chlorine gases are compressed. Further, the highest temperature reaction is that involving thermal decomposition of a metal trichloride which is facilitated by a partial vacuum. This reaction temperature can be lowered if desired at the expense, however, of added work. Some of the internally generated exothermic reaction heat is available to perform this work.

It is claimed:

1. The process for generation of hydrogen and oxygen from water comprising the steps of:
   a. decomposing a metal trichloride, selected from the group consisting of samarium, europium and ytterbium trichlorides, at a temperature sufficient to produce a metal dichloride and chlorine gas;
b. removing the chlorine formed during said decomposition;
c. bringing the chlorine into contact with a metal oxide at a temperature sufficient to produce a metal chlorine and oxygen, the metal oxide being selected from a group consisting of magnesium, nickel, cobalt and yttrium oxides;
d. removing and collecting the oxygen produced during the chlorine-metal oxide reaction;
e. hydrolyzing the metal chloride formed during the reaction of step (c) at a temperature sufficient to produce the metal oxide used during step (c) and hydrogen chloride gas;
f. reacting the hydrogen chloride produced by the reaction step (e) with the metal dichloride produced by step (a) at a temperature sufficient to produce a metal trichloride and hydrogen gas;
g. removing and collecting said hydrogen gas; and
h. decomposing said trichloride as recited in step (a), and repeating the cycle.

2. The process of claim 1, wherein said metal trichloride is samarium trichloride, the decomposing in step (a) is conducted at a temperature of at least about 1750° C, and the reacting in step (f) is conducted at a temperature of about 700° C.

3. The process of claim 2, wherein said metal oxide is magnesium oxide and the chlorine is brought into contact with the magnesium oxide in step (c) at a temperature of about 150° C, and the hydrolysis in step (e) is conducted at a temperature of at least about 500° C.

4. The process of claim 2, wherein said metal oxide is nickel oxide and the chlorine is brought into contact with the nickel oxide in step (c) at a temperature of about 400° C, and the hydrolysis in step (e) is conducted at a temperature of at least about 700° C.

5. The process of claim 2, wherein said metal oxide is cobalt oxide and the chlorine is brought into contact with the cobalt oxide in step (c) at a temperature of about 450° C, and the hydrolysis in step (e) is conducted at a temperature of at least about 750° C.

6. The process of claim 2, wherein said metal oxide is yttrium oxide and the chlorine is brought into contact with the yttrium oxide in step (c) at a temperature of about 50° C, and the hydrolysis in step (e) is conducted at a temperature of at least about 450° C.

7. The process of claim 1, wherein said metal trichloride is europium trichloride, the decomposition in step (a) is conducted at a temperature of at least about 850° C, and the reacting in step (f) is conducted at a temperature of at least about 25° C.

8. The process of claim 7, wherein said metal oxide is magnesium oxide and the chlorine is brought into contact with the magnesium oxide in step (c) at a temperature of about 150° C, and the hydrolysis in step (e) is conducted at a temperature of at least about 500° C.

9. The process of claim 7, wherein said metal oxide is nickel oxide and the chlorine is brought into contact with the nickel oxide in step (c) at a temperature of about 400° C, and the hydrolysis in step (e) is conducted at a temperature of at least about 700° C.

10. The process of claim 7, wherein said metal oxide is cobalt oxide and the chlorine is brought into contact with the cobalt oxide in step (c) at a temperature of about 450° C, and the hydrolysis in step (e) is conducted at a temperature of at least about 750° C.

11. The process of claim 7, wherein said metal oxide is yttrium oxide and the chlorine is brought into contact with the yttrium oxide in step (c) at a temperature of about 50° C, and the hydrolysis in step (e) is conducted at a temperature of at least about 450° C.

12. The process of claim 1, wherein said metal trichloride is ytterbium trichloride, the decomposition in step (a) is conducted at a temperature of at least about 1050° C, and the reacting in step (f) is conducted at a temperature of about 300° C.

13. The process of claim 12, wherein said metal oxide is magnesium oxide and the chlorine is brought into contact with the magnesium oxide in step (c) at a temperature of about 150° C, and the hydrolysis in step (e) is conducted at a temperature of at least about 500° C.

14. The process of claim 12, wherein said metal oxide is nickel oxide and the chlorine is brought into contact with the nickel oxide in step (c) at a temperature of about 400° C, and the hydrolysis in step (e) is conducted at a temperature of at least about 700° C.

15. The process of claim 12, wherein said metal oxide is cobalt oxide and the chlorine is brought into contact with the cobalt oxide in step (c) at a temperature of about 450° C, and the hydrolysis in step (e) is conducted at a temperature of at least about 750° C.

16. The process of claim 12, wherein said metal oxide is yttrium oxide and the chlorine is brought into contact with the yttrium oxide in step (c) at a temperature of at least about 50° C, and the hydrolysis in step (e) is conducted at a temperature of at least about 450° C.

17. The process for generation of hydrogen and oxygen from water comprising the steps of:
a. decomposing a metal tribromide, selected from the group consisting of vanadium and chromium tribromides, at a temperature sufficient to produce a metal dibromide and bromine gas;
b. removing the bromine formed during said decomposition;
c. bringing the bromine in contact with a metal oxide at a temperature sufficient to form a higher valence metal oxide and a metal bromide, the metal oxide being selected from a group consisting of manganese and cobalt oxides;
d. removing the metal oxide and metal bromide products of the reaction of step (c) and separating them;
e. removing said metal oxide;
f. decomposing the metal oxide at a temperature sufficient to produce a lower valence metal oxide and oxygen gas;
g. removing and storing said oxygen;
h. removing the metal bromide separated in step (d);
i. hydrolyzing the removed metal bromide at a temperature sufficient to produce a metal oxide and hydrogen bromide;
j. collecting the metal oxides produced by steps (f) and (i) and reacting them with bromine as recited in step (c);
k. reacting the hydrogen bromide produced by the reaction of step (i) with the metal dibromide produced in step (a) at a temperature sufficient to produce a metal tribromide and hydrogen gas;
l. removing and collecting said hydrogen gas; and
m. decomposing said tribromide as recited in step (a) and repeating the cycle.

18. The process of claim 17, wherein the metal oxide and metal bromide are separated in step (d) by flotation of the metal bromide in a liquid of intermediate density.

19. The process of claim 18, wherein the metal oxide of step (c) is manganese oxide and the liquid of intermediate density is molten copper bromide.

20. The process of claim 18, wherein the metal oxide of step (c) is cobalt oxide and the liquid of intermediate density is molten silver chloride.

21. The process of claim 17, wherein said metal bromide is vanadium tribromide, the decomposition in step (a) is conducted at a temperature of at least about 650° C, and the reaction in step (k) is conducted at a temperature of about 25° C.

22. The process of claim 21, wherein said metal oxide is manganese oxide and the bromine is brought into contact with the manganese oxide in step (c) at a temperature of about 650° C to 700° C, the decomposition of step (f) is conducted at a temperature of at least about 950° C, and the hydrolysis in step (i) is conducted at a temperature of at least about 1100° C.

23. The process of claim 21, wherein said metal oxide is cobalt oxide and the bromine is brought into contact with the cobalt oxide in step (c) at a temperature of about 650° C to 700° C, the decomposition of step (f) is conducted at a temperature of at least about 900° C, and the hydrolysis in step (i) is conducted at a temperature of at least about 1050° C.

24. The process of claim 17, wherein said metal bromide is chromium tribromide, the decomposition in step (a) is conducted at a temperature of at least about 750° C, and the reaction in step (k) is conducted at a temperature of about 50° C or greater.

25. The process of claim 24, wherein said metal oxide is manganese oxide and the bromine is brought into contact with the manganese oxide in step (c) at a temperature of about 650° C to 700° C, the decomposition of step (f) is conducted at a temperature of at least about 900° C, and the hydrolysis in step (i) is conducted at a temperature of at least about 1100° C.

26. The process of claim 24, wherein said metal oxide is cobalt oxide and the bromine is brought into contact with the cobalt oxide in step (c) at a temperature of about 650° C to 700° C, the decomposition of step (f) is conducted at a temperature of at least about 900° C, and the hydrolysis in step (i) is conducted at a temperature of at least about 1050° C.

* * * * *